United States Patent
Cui et al.

(10) Patent No.: US 12,200,557 B2
(45) Date of Patent: Jan. 14, 2025

(54) ENHANCEMENT IN NTN MOBILITY

(71) Applicant: APPLE INC., Cupertino, CA (US)

(72) Inventors: Jie Cui, Cupertino, CA (US);
Chunxuan Ye, San Diego, CA (US);
Dawei Zhang, Cupertino, CA (US);
Hong He, Cupertino, CA (US);
Huaning Niu, Cupertino, CA (US);
Manasa Raghavan, Cupertino, CA (US); Qiming Li, Beijing (CN); Sarma V. Vangala, Cupertino, CA (US); Xiang Chen, Cupertino, CA (US); Yang Tang, Cupertino, CA (US)

(73) Assignee: APPLE INC., Cupertino, CA (US)

(*) Notice: Subject to any disclaimer, the term of this patent is extended or adjusted under 35 U.S.C. 154(b) by 423 days.

(21) Appl. No.: 17/593,432

(22) PCT Filed: Apr. 2, 2021

(86) PCT No.: PCT/CN2021/085158
§ 371 (c)(1),
(2) Date: Sep. 17, 2021

(87) PCT Pub. No.: WO2022/205395
PCT Pub. Date: Oct. 6, 2022

(65) Prior Publication Data
US 2023/0247507 A1 Aug. 3, 2023

(51) Int. Cl.
*H04W 36/08* (2009.01)
*H04W 36/24* (2009.01)
*H04W 36/00* (2009.01)

(52) U.S. Cl.
CPC ....... *H04W 36/083* (2023.05); *H04W 36/249* (2023.05); *H04W 36/0022* (2013.01)

(58) Field of Classification Search
CPC .......... H04W 36/083; H04W 36/0072; H04W 36/0022
See application file for complete search history.

(56) References Cited

U.S. PATENT DOCUMENTS

2019/0044611 A1* 2/2019 Treesh ................ H04B 7/2041
2019/0075468 A1  3/2019 Fujii
(Continued)

FOREIGN PATENT DOCUMENTS

CN    109076348 A    12/2018
CN    112566195 A    3/2021
(Continued)

OTHER PUBLICATIONS

OPPO, "Discussion on mobility management for connected mode UE in NTN," R2-2100164 (update of R2-2009112) 3GPP TSG-RAN WG2 Meeting #113-e, Electronic, Agenda Item 8.10.3.3, Jan. 25-Feb. 5, 2021, 4 pages. (Year: 2021).*

(Continued)

*Primary Examiner* — Jamal Javaid
*Assistant Examiner* — Ryan C Kavleski
(74) *Attorney, Agent, or Firm* — Dorsey & Whitney LLP

(57) ABSTRACT

Apparatuses, systems, and methods for enhancement in NTN mobility. A cellular base station may serve as a source base station of a handover procedure from the source base station to a target non-terrestrial network (NTN) base station. The cellular base station may configure a parameter associated with the target NTN base station in a handover command, the parameter being related to NTN mobility, and send the handover command to a wireless device for use by the wireless device during the handover procedure. The wireless device may receive the handover command from (Continued)

the cellular base station, and perform the handover procedure using the parameter associated with the target NTN base station.

12 Claims, 8 Drawing Sheets

(56) References Cited

U.S. PATENT DOCUMENTS

| | | | |
|---|---|---|---|
| 2020/0260347 A1 | 8/2020 | Xu et al. | |
| 2020/0314914 A1 | 10/2020 | Roy et al. | |
| 2021/0099223 A1 | 4/2021 | Zhang et al. | |
| 2021/0250816 A1* | 8/2021 | Xu | H04W 36/0016 |
| 2022/0109490 A1* | 4/2022 | Ma | H04W 72/20 |
| 2022/0217589 A1 | 7/2022 | Wang et al. | |
| 2022/0224405 A1 | 7/2022 | Zhou et al. | |
| 2024/0031001 A1* | 1/2024 | Cheema | H04B 7/10 |

FOREIGN PATENT DOCUMENTS

| | | | |
|---|---|---|---|
| CN | 112584412 A | 3/2021 | |
| CN | 112584528 A | 3/2021 | |
| WO | WO-2022091037 A1 * | 5/2022 | H04W 36/0016 |

OTHER PUBLICATIONS

OPPO, "Discussion on mobility management for connected mode UE in NTN", R2-2100164 (update of R2-2009112) 3GPP TSG-RAN WG2 Meeting #113-e, Electronic, Agenda Item 8.10.3.3, Jan. 25-Feb. 5, 2021, 4 pages.
PCT/CN2021/085158, International Search Report and Written Opinion, Jan. 5, 2022, 9 pages.
ZTE Corporation, Sanechips, "Consideration on mobility enhancement in NTN", R2-2006873, 3GPP TSG-RAN WG2 Meeting#111, Electronic, Agenda Item 8.10.3.2, Aug. 17-28, 2020, 5 pages.
NEC, "Location based mobility enhancement", R2-1914973, 3GPP TSG-RAN WG2 #108, Reno, Nevada, Agenda Item 6.6.4.1, Nov. 18-22, 2019, 4 pages.

* cited by examiner

Configure polarization information associated with a target cellular base station to be measured by a wireless device in the NTN serving base station, for use by the wireless device during measurement of the target cellular base station
1002

ENHANCEMENT IN NTN MOBILITY

FIELD

The present application relates to wireless communication systems, and more particularly to apparatus, systems, and methods for enhancement in NTN mobility.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), BLUETOOTH™, etc.

The ever increasing number of features and functionality introduced in wireless communication devices also creates a continuous need for improvement in both wireless communications and in wireless communication devices. To increase coverage and better serve the increasing demand and range of envisioned uses of wireless communication, in addition to the communication standards mentioned above, there are further wireless communication technologies under development, including fifth generation (5G) new radio (NR) communication. Accordingly, improvements in the field in support of such development and design are desired.

SUMMARY

New cellular communication techniques are continually under development, to increase coverage, to better serve the range of demands and use cases, and for a variety of other reasons. One technique that is currently under development may related to a non-terrestrial network (NTN).

In NTN, a wireless device may communicate with an NTN base station (such as a satellite gNodeB). A distance between the wireless device and the NTN base station is much larger than a distance between the wireless device and a terrestrial network (TN) base station (such as a ground gNodeB). Further, the coverage area of the NTN base station may become larger than that of the TN base station.

Due to the impact of the above changes, in NTN mobility scenarios (such as a handover to an NTN base station, or a beam switching to a beam of an NTN base station), parameters related to NTN mobility may become necessary for a wireless device, and the signaling of the parameters may need redesign. For example, the propagation delay in NTN may become larger, and thus the timing relationship in NTN mobility scenario may become different from the conventional timing relationship between the wireless device and the TN base station. In addition, polarization information of the NTN base station may be necessary in NTN mobility scenarios.

However, the issue of how a wireless device may obtain the parameters related to NTN mobility is still under discussion.

Embodiments in the present disclosure relate to apparatuses, systems, and methods for enhancement in NTN mobility.

A cellular base station according to the techniques described herein may serve as a source base station of a handover procedure from the source base station to a target non-terrestrial network (NTN) base station. The cellular base station may configure a parameter associated with the target NTN base station in a handover command, the parameter being related to NTN mobility; and send the handover command to a wireless device for use by the wireless device during the handover procedure.

The wireless device may be able to receive the handover command during the handover procedure, and perform the handover procedure using the parameter associated with the target NTN base station.

A cellular base station according to the techniques described herein may serve as a target NTN base station of a handover procedure from a source base station to the target NTN base station. The cellular base station may configure the parameter associated with the target NTN base station in system information, wherein the system information is to be acquired by a wireless device during the handover procedure.

The wireless device may be able to acquire the system information of the target NTN base station during the handover procedure, and perform the handover procedure using the parameter associated with the target NTN base station.

Therefore, at least according to some embodiments, the NTN mobility may be enhanced.

The techniques described herein may be implemented in and/or used with a number of different types of devices, including but not limited to cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1:
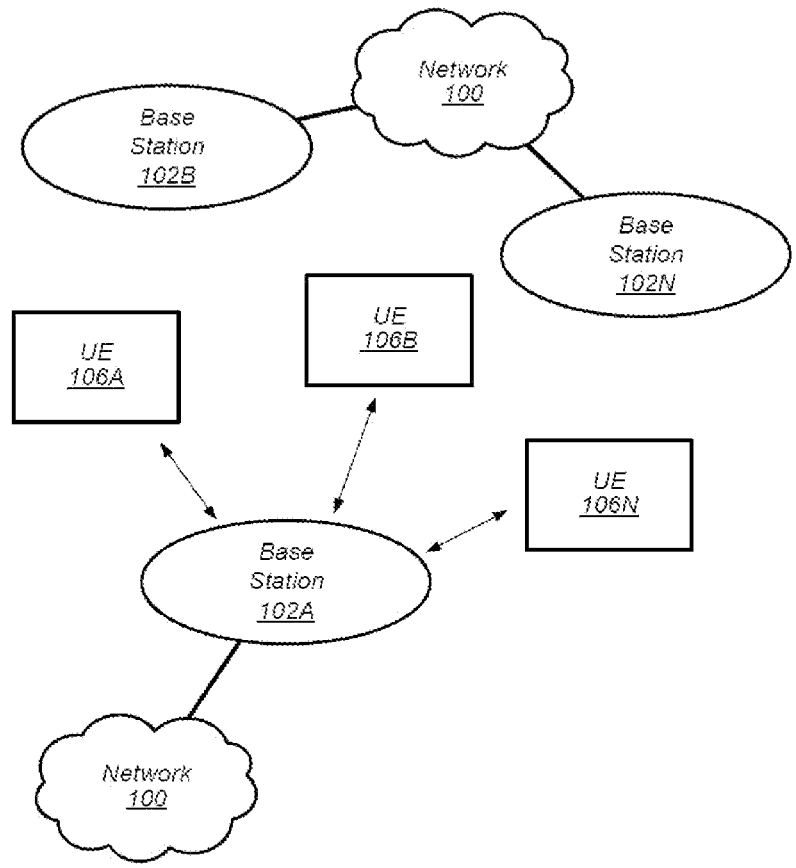
FIG. 1 illustrates an example wireless communication system, according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, such as a user equipment or a cellular network device. Processing elements may include, for example: processors and associated memory, portions or circuits of individual processor cores, entire processor cores, individual processors, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to."Reciting a component that is configured to perform one or more tasks is expressly intended not to invoke 35 U.S.C. § 112(f) interpretation for that component.

Figure 2:
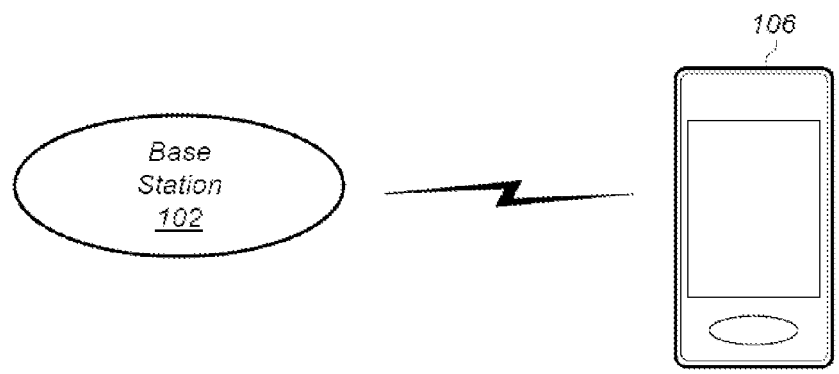
FIG. 2 illustrates a base station (BS) in communication with a user equipment (UE) device, according to some embodiments.

FIGS. 1 and 2—Communication System

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station"), and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as a 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs. For example, it may be possible that that the base station 102A and one or more other base stations 102 support joint transmission, such that UE 106 may be able to receive transmissions from multiple base stations (and/or multiple TRPs provided by the same base station).

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a computer, a laptop, a tablet, a smart watch or other wearable device, or virtually any type of wireless device.

The UE 106 may include a processor (processing element) that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, NR or LTE using at least some shared radio components. As additional possibilities, the UE 106 could be configured to communicate using CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, base station 102A may be a next generation base station, e.g., a 5G New Radio (5G NR) base station, or "gNB". In some embodiments, a gNB may be comlected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs. For example, it may be possible that the base station 102A and one or more other base stations 102 support joint transmission, such that UE 106 may be able to receive transmissions from multiple base stations (and/or multiple TRPs provided by the same base station).

Figure 3:
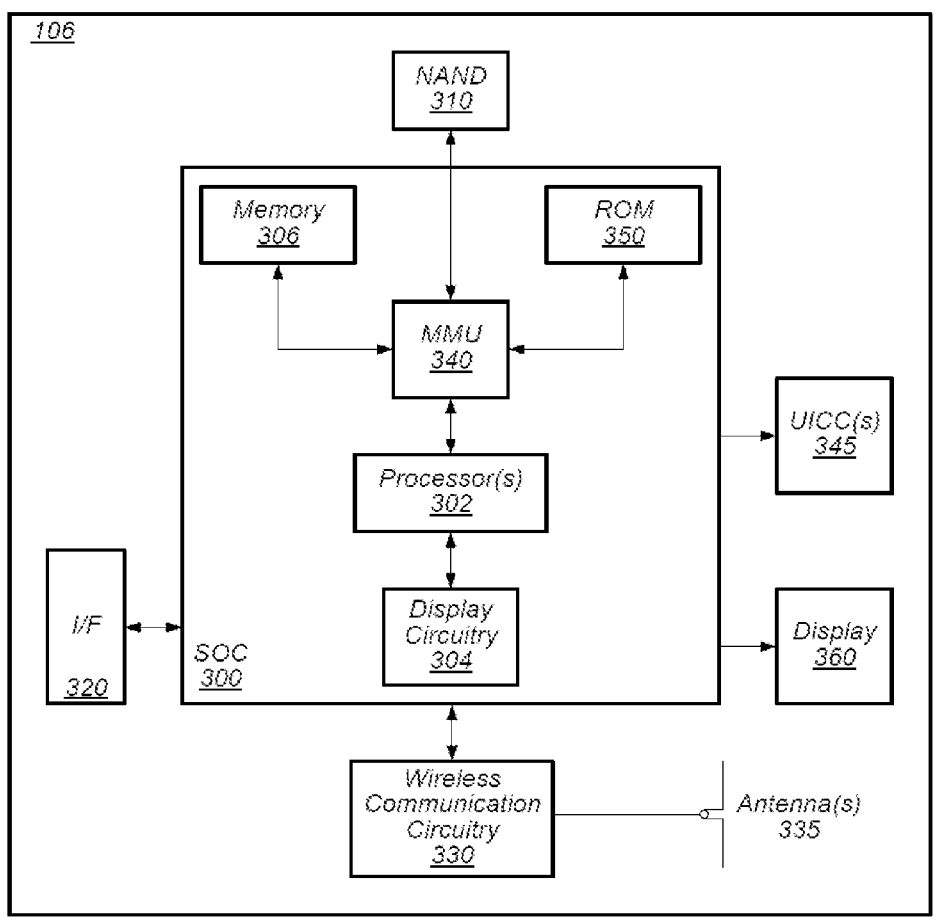
FIG. 3 illustrates an example block diagram of a UE, according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet, and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and wireless communication circuitry 330 (e.g., for LTE, LTE-A, NR, UMTS, GSM, CDMA2000, Bluetooth, Wi-Fi, NFC, GPS, etc.). In some embodiments, communication device 106 may include wired communication circuitry (not shown), such as a network interface card, e.g., for Ethernet.

The wireless communication circuitry 330 may couple (e.g., communicatively; directly or indirectly) to one or more antennas, such as antenna(s) 335 as shown. The wireless communication circuitry 330 may include cellular communication circuitry and/or short to medium range wireless communication circuitry, and may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include one or more receive chains (including and/or coupled to (e.g., communicatively; directly or indirectly) dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with a second radio. The second radio may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. As described herein, the communication device 106 may include hardware and software components for implementing any of the various features and techniques described herein. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, wireless communication circuitry 330 may include one or more processing elements. In other words, one or more processing elements may be included in wireless communication circuitry 330. Thus, wireless communication circuitry 330 may include one or more integrated circuits (ICs) that are configured to perform the functions of wireless communication circuitry 330. In addition, each integrated circuit may include circuitry (e.g., first circuitry, second circuitry, etc.) configured to perform the functions of wireless communication circuitry 330.

Figure 4:
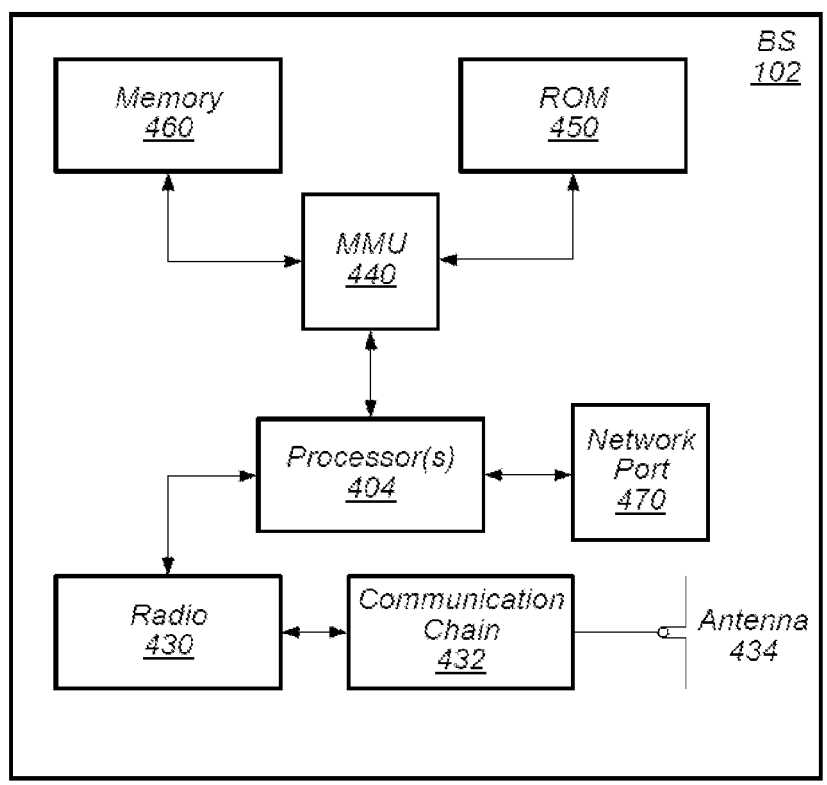
FIG. 4 illustrates an example block diagram of a BS, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and LTE, 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
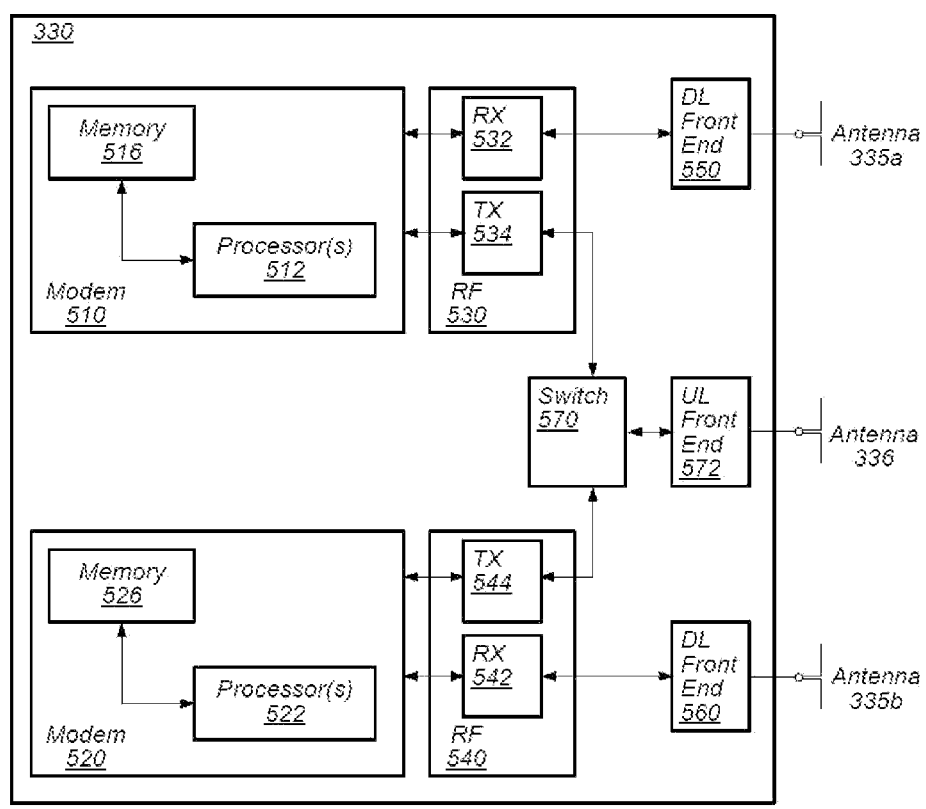
FIG. 5 illustrates an example block diagram of cellular communication circuitry, according to some embodiments.

FIG. 5—Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, or circuits including or coupled to fewer antennas, e.g., that may be shared among multiple RATs, are also possible. According to some embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335*a-b* and 336 as shown. In some embodiments, cellular communication circuitry 330 may include dedicated receive chains (including and/or coupled to (e.g., communicatively; directly or indirectly) dedicated processors and/or radios) for multiple RATs (e.g., a first receive chain for LTE and a second receive chain for 5G NR). For example, as shown in FIG. 5, cellular communication circuitry 330 may include a first modem 510 and a second modem 520. The first modem 510 may be configured for communications according to a first RAT, e.g., such as LTE or LTE-A, and the second modem 520 may be configured for communications according to a second RAT, e.g., such as 5G NR.

As shown, the first modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335*a*.

Similarly, the second modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335*b*.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via the first modem 510), switch 570 may be switched to a first state that allows the first modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via the second modem 520), switch 570 may be switched to a second state that allows the second modem 520 to transmit signals according to the second RAT (e.g., via a transmit chain that includes transmit circuitry 544 and UL front end 572).

As described herein, the first modem 510 and/or the second modem 520 may include hardware and software components for implementing any of the various features and techniques described herein. The processors 512, 522 may be configured to implement part or all of the features described herein, e.g., by executing program instructions stored on a memory medium (e.g., a non-transitory computer-readable memory medium). Alternatively (or in addition), processors 512, 522 may be configured as a programmable hardware element, such as an FPGA (Field Programmable Gate Array), or as an ASIC (Application Specific Integrated Circuit). Alternatively (or in addition) the processors 512, 522, in conjunction with one or more of the other components 530, 532, 534, 540, 542, 544, 550, 570, 572, 335 and 336 may be configured to implement part or all of the features described herein.

In addition, as described herein, processors 512, 522 may include one or more processing elements. Thus, processors 512, 522 may include one or more integrated circuits (ICs) that are configured to perform the functions of processors 512, 522. In addition, each integrated circuit may include circuitry (e.g., first circuitry, second circuitry, etc.) configured to perform the functions of processors 512, 522.

In some embodiments, the cellular communication circuitry 330 may include only one transmit/receive chain. For example, the cellular communication circuitry 330 may not include the modem 520, the RF front end 540, the DL front end 560, and/or the antenna 335b. As another example, the cellular communication circuitry 330 may not include the modem 510, the RF front end 530, the DL front end 550, and/or the antenna 335a. In some embodiments, the cellular communication circuitry 330 may also not include the switch 570, and the RF front end 530 or the RF front end 540 may be in communication, e.g., directly, with the UL front end 572.

Figure 6:
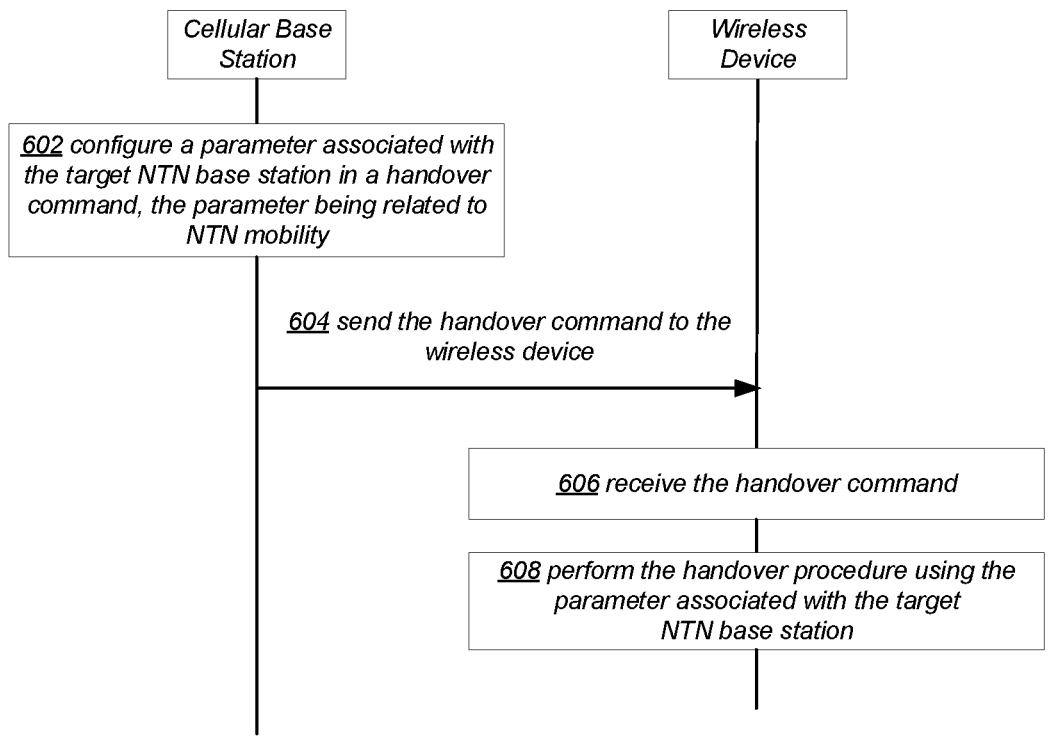
FIGS. 6-7 are signaling diagrams illustrating example methods for enhancement in NTN mobility in handover scenarios, according to some embodiments.
Figure 7:
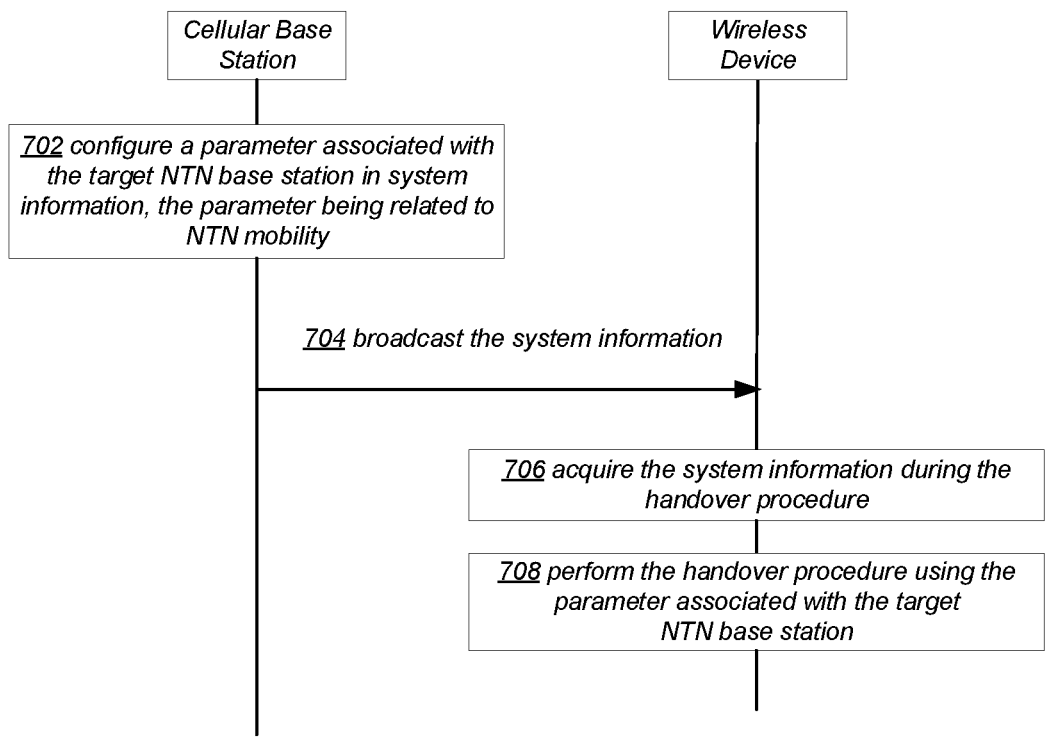

FIGS. 6 and 7—Methods for Enhancement in NTN Mobility in Handover Scenarios

FIG. 6 is a signaling diagram illustrating an example method for enhancement in NTN mobility in a handover scenario, according to some embodiments, wherein a parameter related to NTN mobility is configured by a source base station in a handover command.

It should be understood that in NTN mobility in handover scenarios discussed herein, the source base station indicates a current serving base station of a wireless device, and the target base station indicates a serving base station of the wireless device after the handover. Further, the source base station is a TN base station or an NTN base station, and the target base station is an NTN base station.

The cellular base station of FIG. 6 may correspond to a base station such as a BS 102 illustrated in various of the Figures herein, and the wireless device of FIG. 6 may correspond to a wireless device such as a UE 106 illustrated in various of the Figures herein. In various embodiments, some of the elements of the methods shown may be performed concurrently, in a different order than shown, may be substituted for by other method elements, or may be omitted. Additional elements may also be performed as desired.

In FIG. 6, the cellular base station serves as the source base station. That is, the handover procedure will be performed by the wireless device from the source base station to the target NTN base station.

At 602, the cellular base station, which serves as the source base station, may configure a parameter associated with the target NTN base station in a handover command, the parameter being related to NTN mobility.

At 604, the cellular base station may send the handover command to the wireless device for use by the wireless device during the handover procedure.

At 606, the wireless device may receive the handover command from the cellular base station, wherein the handover command including the parameter associated with the target NTN base station, the parameter being related to NTN mobility.

At 608, the wireless device may perform the handover procedure using the parameter associated with the target NTN base station.

According to the present disclosure, the parameter associated with the target NTN base station, which is related to NTN mobility, may be configured by the source base station and send to the wireless device. Accordingly, the wireless device may be able to use the parameter related to NTN mobility in the handover procedure, and thus the NTN mobility may be enhanced.

In some embodiments, the parameter related to NTN mobility may include a first parameter related to a timing relationship of the target NTN base station. As mentioned above, due to the large scale of NTN, the propagation delay in NTN may become larger, and thus the timing relationship in NTN mobility scenario may become different from the conventional timing relationship between the wireless device and the TN base station. By configuring the parameter related to the timing relationship of the target NTN base station in the handover command, the wireless device may obtain the timing relationship which is associated with the target NTN base station from the handover command, and thus the signal transmission after the handover procedure may become more smoothly.

In some embodiments, the first parameter related to the timing relationship of the target NTN base station may include at least one of a K_offset and a common timing offset.

The K_offset in NTN can be applied to indicate the first transmission opportunity of physical uplink shared channel (PUSCH), and can also be applied to indicate the transmission timing of downlink control information (DCI) scheduled PUSCH. Further, the common timing offset in NTN may be applied to compensate a timing advance (TA) of the wireless device so as to determine an uplink transmission timing of the wireless device.

It should be understood that the definitions and meanings of "K_offset" and "common timing offset" herein are the same as that in the 3GPP specification documents. Further, "K_offset" and "common timing offset" are merely examples of the first parameter related to the timing relationship, and other parameters related to the timing relationship may also correspond to the first parameter of the present disclosure.

By configuring the first parameter related to the timing relationship of the target NTN base station in the handover command for use by the wireless device during the handover procedure, timing relationship enhancement in NTN mobility may be achieved.

In some embodiments, the parameter related to NTN mobility may include a second parameter related to polarization information of the target NTN base station. As mentioned above, polarization information of the NTN base station may be necessary in NTN mobility scenarios. By configuring the polarization information in the handover command for use by the wireless device during the handover procedure, the NTN mobility may be further enhanced. The exemplary polarization information may be in terms of vertical/horizontal polarization, single/dual polarization, or others.

In some embodiments, the cellular base station of FIG. 6 may configure the parameter associated with the target NTN base station in a field of "ServingCellConfigCommon" in the handover command.

Below shows an exemplary signaling design of "ServingCellConfigCommon" in the handover command, in which three parameters associated with the target NTN base station and related to NTN mobility, i.e., the K_offset indicated by "k-offset", the common timing offset indicated by "common-TimingOffset" and the polarization information indicated by "polarization-info" are configured. Specifically, as shown in the following signaling design, "phyCellId" indicates the ID of the target NTN base station, and the parameters "k-offset", "common-TimingOffset", and "polarization-Info" are cell-specific information which are associated with the target NTN base station indicated by the "phyCellId". Further, "downlinkConfigCommon" and "uplinkConfigCommon" indicate the uplink and downlink configurations of the target NTN base station.

```
ServingCellConfigCommon ::=    SEQUENCE {
    physCellId                 PhysCellId
    downlinkConfigCommon       DownlinkConfigCommon
    uplinkConfigCommon         UplinkConfigCommon
    ......                     ......
    k-offset                   INTEGER (1. .m) ,
    common-TimingOffset        ENUMERATED {...}
    polarization-Info          parameter-type TBD
    ......
}
```

In some conditions, the polarization information may be different for uplink and downlink. Therefore, in some embodiments, the second parameter may include uplink polarization information and downlink polarization information. The cellular base station of FIG. 6 may configure the uplink polarization information and the downlink polarization information separately.

For example, the "polarization-Info" configured in the above "ServingCellConfigCommon" may be separated into "uplink polarization-Info" and "downlink polarization-Info". As another example, the uplink polarization information and the downlink polarization information may be configured in the fields of "uplinkConfigCommon" and "downlinkConfigCommon" in "ServingCellConfigCommon" respectively.

Further, in some conditions, the K_offset and/or the common timing offset may only be required in uplink transmissions, and thus it is possible that the cellular base station only configures the K_offset and/or the common timing offset in "UplinkConfigCommon", but omits their configurations in "DownlinkConfigCommon". Below shows an exemplary signaling design where the three parameters K_offset, common timing offset and polarization information are configured in "UplinkConfigCommon", while only the polarization information is configured in "DownlinkConfigCommon".

```
UplinkConfigCommon ::=     SEQUENCE {
    ...                    ...
    k-offset               INTEGER (1. .m) ,
    common-TimingOffset    ENUMERATED {...}
    polarization-Info      parameter-type TBD
}
DownlinkConfigCommon ::=   SEQUENCE {
    ...                    ...
    polarization-Info      parameter-type TBD
    ...
}
```

The above configurations of the parameters associated with the target NTN base station are cell-specific configurations, i.e., for one target NTN base station, the configuration for the parameter is the same. In some conditions, the target NTN base station may include a plurality of beams. By configuring the parameter in a beam-specific manner, the NTN mobility may be further enhanced.

Specifically, in some embodiments, the parameter may be associated with a beam of the target NTN base station to which the wireless device is to be switched. Below shows an exemplary signaling design of the beam-specific configuration for the three parameters "k-offset", "common-TimingOffset" and "polarization-info" in the handover command. As can be seen, the three parameters are associated not only with the target NTN base station which is indicated by "physCellId", but also associated with the target beam to be switched to (which is indicated by "BeamIndex"). Further, in addition to "BeamIndex", the beam may also be indicated by a transmission configuration indicator (TCI) index or a beam foot print ID, or other parameter which may specify the beam.

```
physCellId                      physCellId      -- target serving cell ID
BeamIndex(or TCI index or       parameter-type TBD  -- target beam
    beam foot print ID)         of target serving cell
k-offset                        INTEGER (1..m),
common-TimingOffset             ENUMERATED {...}
polarization-Info               parameter-type TBD
```

FIG. 7 is a signaling diagram illustrating an example method for enhancement in NTN mobility in a handover scenario, according to some embodiments, wherein a parameter related to NTN mobility is configured by a source base station in system information.

The cellular base station of FIG. 7 may correspond to a base station such as a BS 102 illustrated in various of the Figures herein, and the wireless device of FIG. 7 may correspond to a wireless device such as a UE 106 illustrated in various of the Figures herein. In various embodiments, some of the elements of the methods shown may be performed concurrently, in a different order than shown, may be substituted for by other method elements, or may be omitted. Additional elements may also be performed as desired.

In FIG. 7, the cellular base station serves as the target NTN base station of the handover procedure. That is, the handover procedure will be performed by the wireless device from the source base station to the target NTN base station.

At 702, the cellular base station, which serves as the target NTN base station, may configure a parameter associated with the target NTN base station in system information, the parameter being related to NTN mobility. The parameter and the configuration thereof described with respect to FIG. 7 may be similar as FIG. 6, and thus the detailed description for the parameter is omitted here.

At 704, the cellular base station may broadcast the system information in its coverage area.

At 706, the wireless device may acquire the system information of target NTN base station during the handover procedure. For example, the wireless device may read the broadcasted system information (such as system information block (SIB) or master information block (MIB)) of the target NTN base station, so as to acquire the parameter associated with the target NTN base station.

At 708, the wireless device may perform the handover procedure using the parameter associated with the target NTN base station.

According to the present disclosure, the parameter associated with the target NTN base station, which is related to NTN mobility, may be configured by the target NTN base station in the system information. Further, the wireless device be configured to read the system information to acquire the parameter during the handover procedure. Accordingly, the wireless device may be able to use the parameter related to NTN mobility in the handover procedure, and thus the NTN mobility may be enhanced.

During a conventional handover procedure, the wireless device will not read the system information of the target base station. However, in the present disclosure, since the wireless device is configured to acquire the system information of the target NTN base station during the handover procedure at 706, an interruption time for handover delay caused by the handover procedure need to be redesign. In some embodiments, the interruption time for handover delay caused by the handover procedure may be configured based on system information acquisition time required by the wireless device to acquire the system information during the handover procedure. As a possible implementation, the interruption time may be extended to include the system information acquisition time of the target NTN base station.

For example, the following expression (1) shows the interruption time $T_{interrupt}$ defined in the existing 3GPP specification documents for a non-conditional handover in which the UE reports the channel condition to the serving cell, and serving cell decides whether to send a handover instruction to the UE based on the channel condition.

$$T_{interrupt}=T_{search}+T_{IU}+T_{processing}+T_\Delta+T_{margin} ms \quad (1)$$

Where:
- $T_{search}$ is the time required to search the target cell when the target cell is not already known when the handover command is received by the UE;
- $T_\Delta$ is time for fine time tracking and acquiring full timing information of the target cell;
- $T_{processing}$ is time for UE processing;
- $T_{margin}$ is time for synchronization signal block (SSB) post-processing;
- $T_{IU}$ is the interruption uncertainty in acquiring the first available physical random access channel (PRACH) occasion in the new cell.

In some embodiments, the interruption time $T_{interrupt}$ for a non-conditional handover delay according to the present disclosure may be extended from expression (1) to include $T_{SI\_NTN}$, which is the system information acquisition time to acquire the parameter related to the target NTN base station (e.g., K_offset and/or common timing offset and/or polarization information). An exemplary expression of the interruption time $T_{interrupt}$ according to the present disclosure is shown as expression (2) below.

$$T_{interrupt}=T_{search}+T_{IU}+T_{processing}+T_\Delta+T_{SI\_MIN}+T_{margin} ms \quad (2)$$

As another example, the following expression (3) shows the interruption time $T_{interrupt}$ defined in the existing 3GPP specification documents for a conditional handover in which the serving cell informs a handover condition to the UE, and the UE autonomously perform handover based on the handover condition.

$$T_{interrupt}=T_{processing}+T_{IU}+T_\Delta+T_{margin} ms \quad (3)$$

Where:
- $T_{processing}$ is time for UE processing;
- $T_{IU}$ is the interruption uncertainty in acquiring the first available PRACH occasion in the new cell;
- $T_\Delta$ is time for fine time tracking and acquiring full timing information of the target cell;
- $T_{margin}$ is time for SSB post-processing.

In some embodiments, the interruption time $T_{interrupt}$ for a conditional handover delay according to the present disclosure may be extended from expression (3) to include $T_{SI\_NTN}$, which is the system information acquisition time to get the parameter related to the target NTN base station (e.g., K_offset and/or common timing offset and/or polarization information). An exemplary expression of the interruption time $T_{interrupt}$ according to the present disclosure is shown as expression (4) below.

$$T_{interrupt}=T_{processing}+T_{IU}+T_\Delta+T_{SI\_NTN}+T_{margin} ms \quad (4)$$

Figure 8:
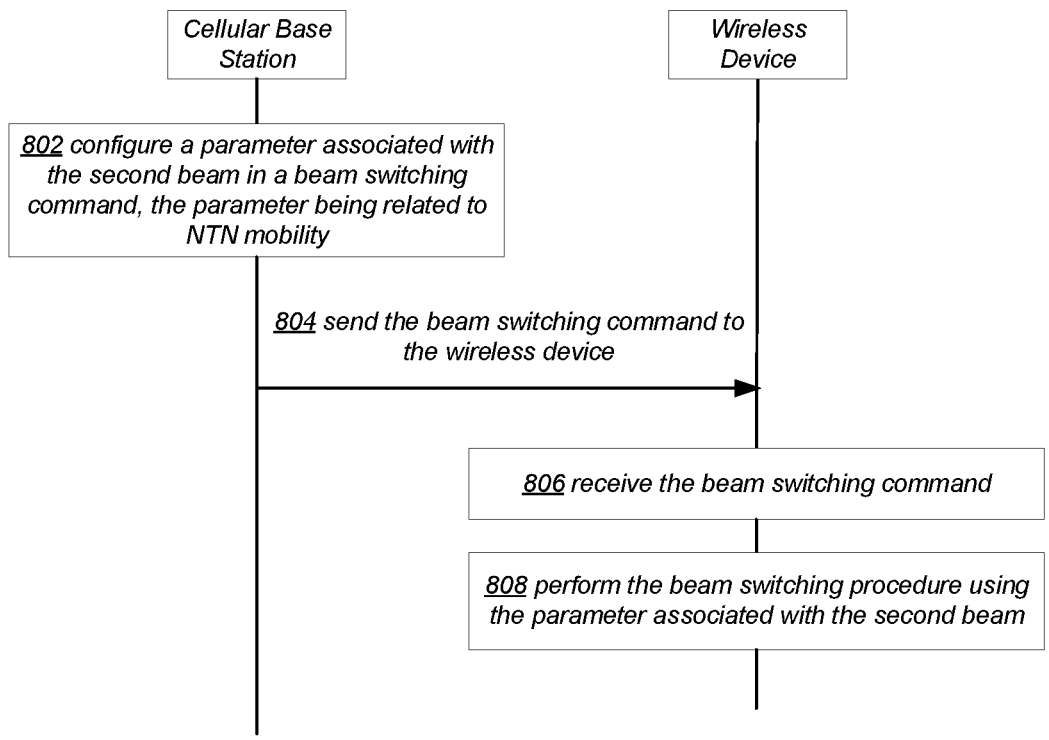
FIGS. 8-9 are signaling diagrams illustrating example methods for enhancement in NTN mobility in beam switching scenarios, according to some embodiments.
Figure 9:
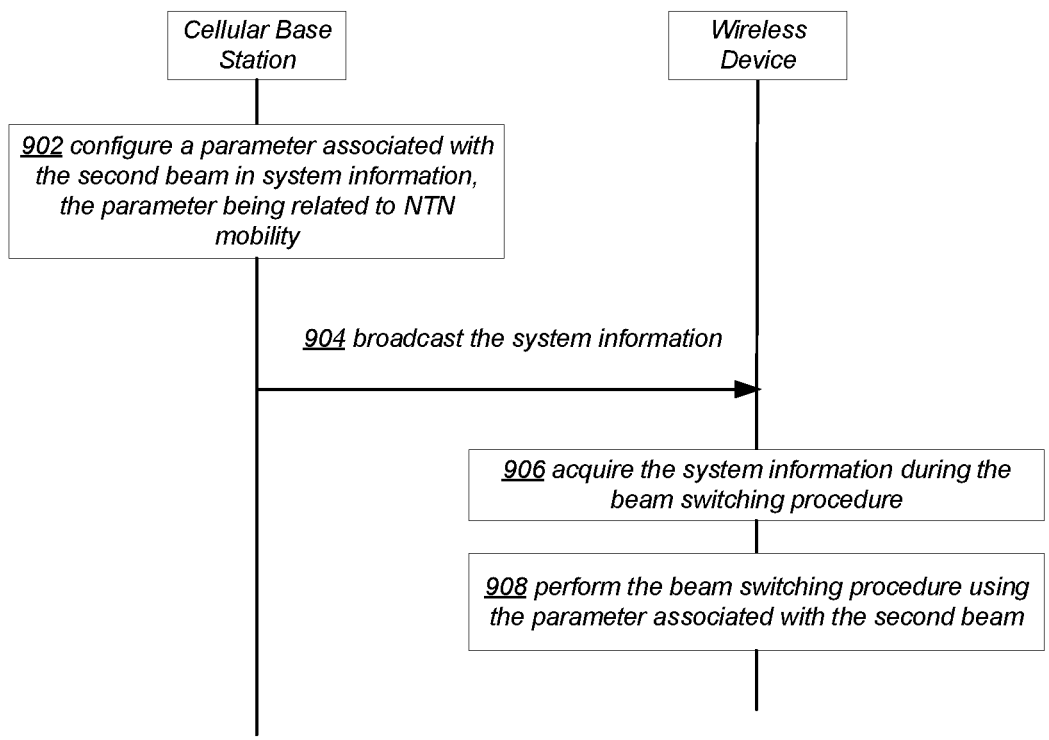

FIGS. 8 and 9—Methods for Enhancement in NTN Mobility in Beam Switching Scenarios FIGS. 6-7 have described methods for enhancement in NTN mobility in handover scenarios. In NTN beam switching scenarios, the techniques described with respect to FIGS. 6-7 may be similarly applied. Such methods for enhancement in NTN mobility in beam switching scenarios will be described with reference to FIGS. 8 and 9.

It should be understood that the NTN beam switching scenarios discussed with respect to FIGS. 8 and 9 are the scenarios in which the wireless device is switched from an old beam (also referred to as "a first beam") to a new beam (also referred to as "a second beam") in the same NTN serving base station.

FIG. 8 is a signaling diagram illustrating an example method for enhancement in NTN mobility in a beam switching scenario, according to some embodiments, wherein a parameter related to NTN mobility is configured by the NTN serving base station in a beam switching command.

The cellular base station of FIG. 8 may correspond to a base station such as a BS 102 illustrated in various of the Figures herein, and the wireless device of FIG. 8 may correspond to a wireless device such as a UE 106 illustrated in various of the Figures herein. In various embodiments, some of the elements of the methods shown may be performed concurrently, in a different order than shown, may be substituted for by other method elements, or may be omitted. Additional elements may also be performed as desired.

In FIG. 8, the cellular base station serves as an NTN serving base station of the wireless device. The wireless device will perform a beam switching procedure from a first beam to a second beam in the NTN serving base station.

At 802, the cellular base station may configure a parameter associated with the second beam in a beam switching command, the parameter being related to NTN mobility.

Similar as described with respect to FIG. 6, in some embodiments, the parameter may include at least one of a first parameter related to a timing relationship of the second beam and a second parameter related to polarization information of the second beam. The first parameter may include at least one of a K_offset and a common timing offset. The second parameter may indicate polarization information in terms of vertical/horizontal polarization, single/dual polarization, or others.

Further, in some embodiments, since the beam switching is performed within the same NTN serving base station, it is not necessary to configure a cell-specific parameter in the beam switching command, and only a beam-specific configuration is necessary. Below shows an exemplary signaling design for the parameter associated with the second beam, in which the "BeamIndex" (or TCI index or beam foot print ID) may indicate the index of the second beam (i.e., the target new beam), the three parameters "k-offset", "common-TimingOffset" and "polarization-info" may indicate the parameter related to NTN mobility.

| | |
|---|---|
| BeamIndex(or TCI index or beam foot print ID) | parameter-type TBD -- target new beam of current serving cell |
| k-offset | INTEGER (1..m), |
| common-TimingOffset | ENUMERATED {...} |
| polarization-Info | parameter-type TBD |

FIG. 9 is a signaling diagram illustrating an example method for enhancement in NTN mobility in a beam switching scenario, according to some embodiments, wherein a parameter related to NTN mobility is configured by the NTN serving base station in system information.

The cellular base station of FIG. 9 may correspond to a base station such as a BS 102 illustrated in various of the Figures herein, and the wireless device of FIG. 9 may correspond to a wireless device such as a UE 106 illustrated in various of the Figures herein. In various embodiments, some of the elements of the methods shown may be performed concurrently, in a different order than shown, may be substituted for by other method elements, or may be omitted. Additional elements may also be performed as desired.

In FIG. 9, the cellular base station serves as an NTN serving base station of the wireless device. The wireless device will perform a beam switching procedure from a first beam to a second beam in the NTN serving base station. The method in FIG. 9 differs from the method in FIG. 8 in that the parameter associated with the second beam is configured in system information, instead of the beam switching command as in FIG. 8. Other aspects of the methods in FIGS. 8 and 9 are similar and thus are omitted here.

At 902, the cellular base station may configure a parameter associated with the second beam in system information, the parameter being related to NTN mobility.

At 904, the cellular base station may broadcast the system information in its coverage area.

At 906, the wireless device may acquire the system information of the NTN serving base station during the beam switching procedure. For example, the wireless device may be configured to read the broadcasted system information (such as SIB or MIB) of the cellular base station during the beam switching procedure.

At 908, the wireless device may perform the beam switching procedure using the parameter associated with the second beam.

During a conventional beam switching procedure, the wireless device will not read the system information of the serving base station. However, in the present disclosure, since the wireless device is configured to acquire the system information of the NTN serving base station during the beam switching procedure at 906, a switching delay caused by the beam switching procedure need to be redesign. In some embodiments, the switching delay caused by the beam switching procedure may be configured based on system information acquisition time required by the wireless device to acquire the system information during the beam switching procedure. As a possible implementation, the switching delay may be extended to include the system information acquisition time $T_{SI\_NTN}$ of the NTN serving base station.

In some embodiments, the system information acquisition time may be set as 0 in a case where the system information is acquired by the wireless device before the beam switching procedure and is up-to-date to the wireless device. For example, the wireless device may have already read and acquire the system information of the NTN serving base station for other operations recently. In this case, the wireless device may not need to re-acquire the system information from the NTN serving base station during the beam switching procedure, and thus the system information acquisition time may be set as 0.

The following expression (5) shows the switching delay defined in the existing 3GPP specification documents in radio resource control (RRC) based TCI switching period, $$n+(T_{RRC\_processing}+TO_k*(T_{first-SSB}+T_{SSB-proc}))/NR \text{ slot length} \quad (5)$$

where $T_{RRC\_processing}$ is the RRC processing delay, $T_{first-SSB}$ is time to first SSB transmission after RRC processing by the UE, $T_{SSB-proc}$=2 ms, $TO_k$=1 if target TCI state is not in the active TCI state list for physical downlink shared channel (PDSCH), 0 otherwise.

As an example, the switching delay according to the present disclosure may be extended from the above expression (5) to include $K*TSI\_NTN$. The redesigned switching delay is shown in expression (6) below, $$n+(T_{RRC\_processing}+K*T_{SI\_NTN}+TO_k*(T_{first-SSB}+T_{SSB-proc}))/NR \text{ slot length} \quad (6)$$

where $T_{SI\_NTN}$ is the system information acquisition time to acquire the parameter related to the second beam (e.g., beam specific K_offset and/or common timing offset and/or polarization information). If the system information is known to the wireless device, K=0, otherwise K=1.

As another example, the following expression (7) shows the switching delay defined in the existing 3GPP specification documents in media access control-control element (MAC-CE) based TCI switching period, $$n+T_{HARQ}+(3 \text{ } ms+TO_k*(T_{first-SSB}+T_{SSB-proc})/NR \text{ slot length} \quad (7)$$

where $T_{first-SSB}$ is time to first SSB transmission after MAC CE command is decoded by the UE, $T_{SSB-proc}$=2 ms, $TO_k$=1 if target TCI state is not in the active TCI state list for PDSCH, 0 otherwise.

The switching delay according to the present disclosure may be extended from the above expression (7) to include $K*T_{SI\_NTN}$. The redesigned switching delay is shown in expression (8) below, $$n+T_{HARQ}+(3 \text{ } ms+K*T_{SI\_NTN}+TO_k*(T_{first-SSB}+T_{SSB-proc})/NR \text{ slot length} \quad (8)$$

where TSI_NTN is the system information acquisition time to acquire the parameter related to the second beam (e.g., beam specific K_offset and/or common timing offset and/or polarization information). If the system information is known to the wireless device, K=0, otherwise K=1.

Figures 10, 11:
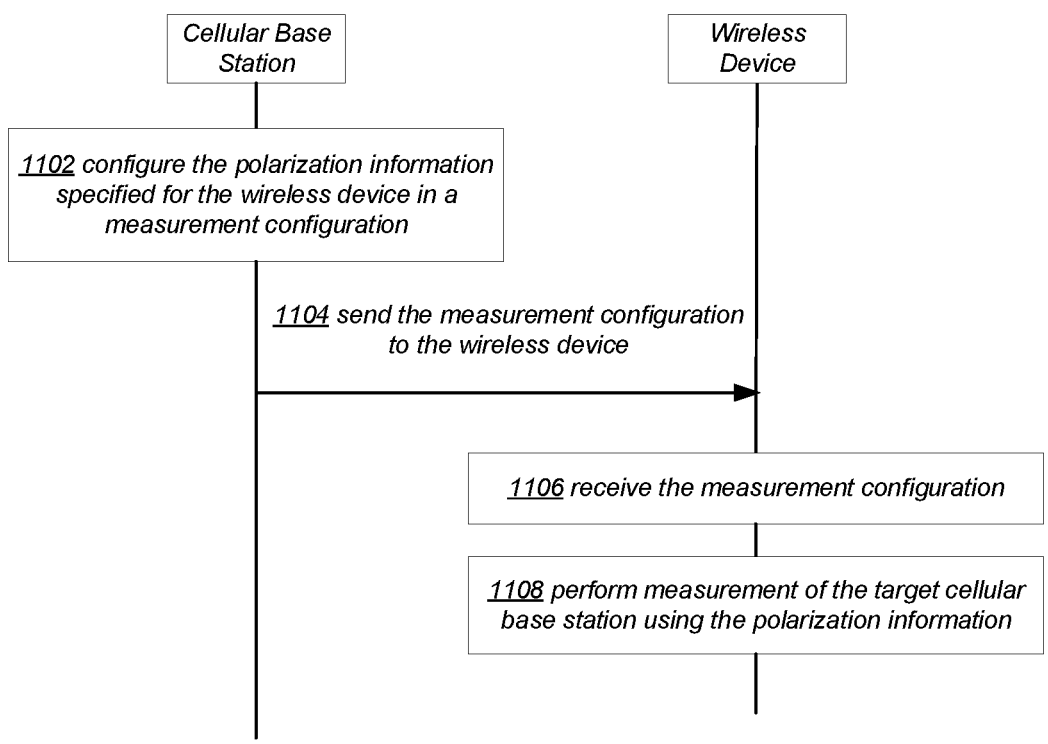
FIG. 10 is a flowchart diagram illustrating an example method for enhancement in an NTN measurement scenario, according to some embodiments.
FIGS. 11-12 are signaling diagrams illustrating example methods for enhancement in NTN measurement scenarios, according to some embodiments.
Figure 12:
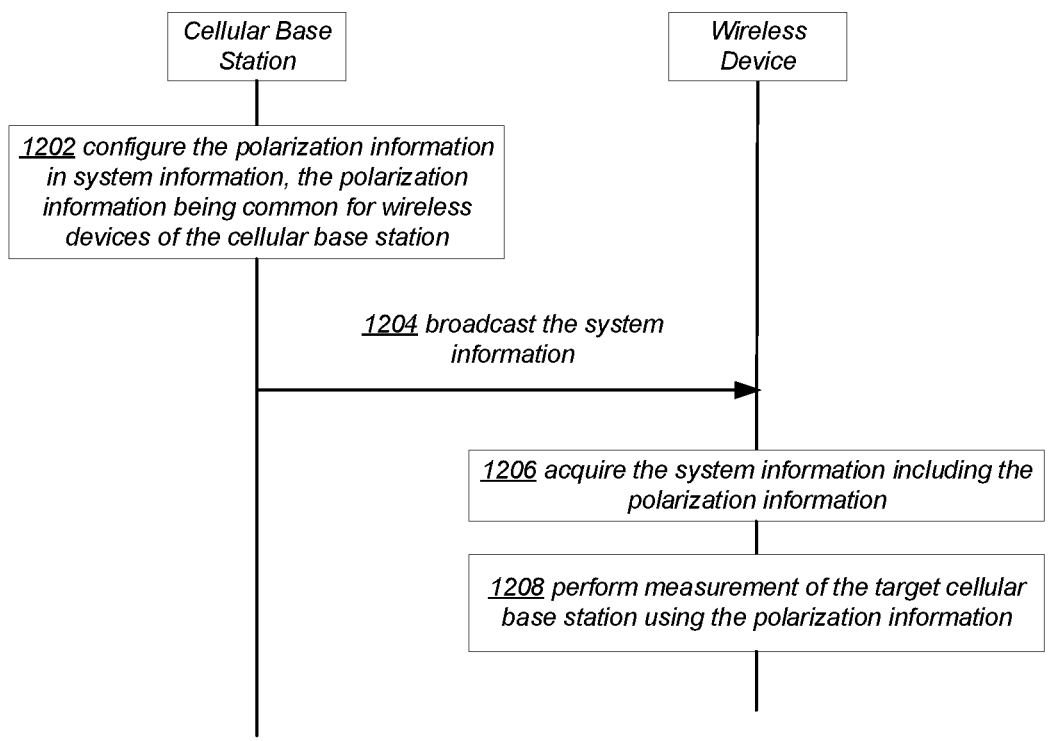

FIGS. 10 to 12—Methods for Enhancement in NTN Measurement Scenarios

The NTN measurement scenarios discussed herein are the scenarios in which the serving base station is an NTN base station, and the NTN serving base station will configure one or more wireless devices of the serving base station to measure neighboring cells (also referred to as "target cellular base stations to be measured"). The neighboring cells may correspond to TN base station or NTN base station.

In some embodiments, during the NTN measurement scenarios, polarization information of the neighboring cells may be used to enhance the measurement performance. FIG. 10 is a flowchart diagram illustrating an example method for enhancement in the NTN measurement scenario, according to some embodiments, wherein the polarization information of a target cellular base station to be measured is configured by the NTN serving base station for use by the wireless device during the measurement of the target cellular base station.

The cellular base station of FIG. 10 may correspond to a base station such as a BS 102 illustrated in various of the Figures herein. In various embodiments, some of the elements of the methods shown may be performed concurrently, in a different order than shown, may be substituted for by other method elements, or may be omitted. Additional elements may also be performed as desired.

In FIG. 10, the cellular base station serves as an NTN serving base station. At 1002, the cellular base station may configure polarization information associated with a target cellular base station to be measured by a wireless device in the NTN serving base station, for use by the wireless device during measurement of the target cellular base station. Accordingly, the wireless device may use the polarization information associated with the target cellular base station (e.g., a neighboring cell) during the measurement, and thus the measurement performance may be enhanced.

In an NTN serving base station, the UEs in the coverage area of the NTN serving base station may have different polarization modes, which depend on specific implementations of antennas of respective UEs. In order to provide polarization information in a more flexible way, in some embodiments, the NTN serving base station may dynamically configure the polarization information for each UE in the serving cell. In other words, a UE-specific configuration of polarization information for measurement may be implemented.

FIG. 11 is a signaling diagram illustrating an example method for dynamically configuring the UE-specific polarization information in a connected mode, according to some embodiments.

The cellular base station of FIG. 11 may correspond to a base station such as a BS 102 illustrated in various of the Figures herein, and the wireless device of FIG. 11 may correspond to a wireless device such as a UE 106 illustrated in various of the Figures herein. In various embodiments, some of the elements of the methods shown may be performed concurrently, in a different order than shown, may be substituted for by other method elements, or may be omitted. Additional elements may also be performed as desired.

The method of FIG. 11 may be implemented a connected mode where the wireless device is connected with the cellular base station.

At 1102, the cellular base station, which serves as the NTN serving base station, may configure the polarization information associated with the target base station to be measured which is specified for the wireless device in a measurement configuration.

At 1104, the cellular base station may send the measurement configuration to the wireless device.

At 1106, the wireless device may receive the measurement configuration including the polarization information associated with the target cellular base station to be measured from the NTN serving base station.

At 1108, the wireless device may perform measurement of the target cellular base station using the polarization information.

According to the present disclosure, the polarization information specified for the wireless device may be sent to the wireless device through the dedicated measurement configuration, and the wireless device may use the dynamically configured polarization information to perform measurement of neighboring cells. Therefore, the measurement performance may be enhanced.

The above described FIG. 11 illustrates the method implemented in the connected mode. However, in an IDLE or inactive mode where the wireless device is not connected with the cellular base station, a dedicated measurement configuration may not be available. In this case, in some embodiments, the NTN serving base station may configure the polarization information of the target base station to be measured in system information of the NTN serving base station.

FIG. 12 illustrate a signaling diagram of an example method for configuring the polarization information which is common for wireless devices of the NTN serving base station in an IDLE or inactive mode, according to some embodiments.

The cellular base station of FIG. 12 may correspond to a base station such as a BS 102 illustrated in various of the Figures herein, and the wireless device of FIG. 12 may correspond to a wireless device such as a UE 106 illustrated in various of the Figures herein. In various embodiments, some of the elements of the methods shown may be performed concurrently, in a different order than shown, may be substituted for by other method elements, or may be omitted. Additional elements may also be performed as desired.

At 1202, the cellular base station, which serves as the NTN serving base station, may configure the polarization information associated with the target base station to be measured in system information, the polarization information being common for wireless devices of the cellular base station. In some embodiments, the polarization information may be configured in a cell re-selection configuration in the system information (e.g., SIB 2/3/4).

At 1204, the cellular base station may broadcast the system information in its coverage area.

At 1206, the wireless device may acquire the system information including the polarization information associated with the target cellular base station to be measured by the wireless device. In some embodiments, the wireless device may read the broadcasted system information (e.g., SIB 2/3/4) to acquire the information.

At 1208, the wireless device may perform measurement of the target cellular base station using the polarization information.

According to the present disclosure, even in an IDLE or inactive mode, the polarization information associated with neighboring cells may also be provided to the wireless device to facilitate the measurement of the neighboring cells. Therefore, the measurement performance may be enhanced.

In some embodiments, the polarization information may be configured by the cellular base station (i.e., the NTN serving base station) per frequency layer or per measurement object (MO) or per target cellular base station. For example, the cellular base station may configure the polarization information specified for each wireless device with respect to each frequency layer or MO in the measurement configuration. Similarly, the cellular base station may configure the polarization information specified for each wireless device with respect to each target base station to be measured. As another example, the cellular base station may configure the polarization information which is common for wireless devices of the cellular base station in the system information with respect to each frequency layer or MO, or with respect to each target cellular base station to be measured.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106 or BS 102) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A cellular base station, comprising:
   at least one antenna;
   at least one radio coupled to the at least one antenna; and
   a processor coupled to the at least one radio,
   wherein the cellular base station serves as a target non-terrestrial network (NTN) base station of a handover procedure from a source base station to the target NTN base station, and the processor is configured to:
      configure a parameter associated with the target NTN base station in system information, the parameter being related to NTN mobility,
      wherein the system information is to be acquired by a wireless device during the handover procedure, and
      wherein the parameter includes at least one of a first parameter related to a timing relationship of the target NTN base station and a second parameter related to polarization information of the target NTN base station, and wherein the second parameter includes an uplink polarization information and a downlink polarization information, and the processor is configured to:
      configure the uplink polarization information and the downlink polarization information separately.

2. The cellular base station of claim 1, wherein the processor is configured to:
   configure an interruption time for handover delay caused by the handover procedure based on system information acquisition time required by the wireless device to acquire the system information during the handover procedure.

3. The cellular base station of claim 1, wherein the first parameter includes at least one of a K_offset and a common timing offset, and the processor is configured to:
   configure the K_offset and the common timing offset in "UplinkConfigCommon" in the handover command.

4. The cellular base station of claim 1, wherein the parameter is associated with a beam of the target NTN base station to which the wireless device is to be switched.

5. A cellular base station, comprising:
   at least one antenna;
   at least one radio coupled to the at least one antenna; and
   a processor coupled to the at least one radio,
   wherein the cellular base station serves as a non-terrestrial network (NTN) serving base station of a wireless device during a beam switching procedure from a first beam to a second beam in the NTN serving base station, and the processor is configured to:
      configure a parameter associated with the second beam in system information, the parameter being related to NTN mobility,
      wherein the system information is to be acquired by the wireless device during the beam switching procedure, and wherein a system information acquisition time is set as 0 in a case where the system information is acquired by the wireless device before the beam switching procedure and is up-to-date to the wireless device.

6. The cellular base station of claim 5, wherein the processor is configured to:
   configure a switching delay caused by the beam switching procedure based on the system information acquisition time used by the wireless device to acquire the system information during the beam switching procedure.

7. The cellular base station of claim 5, wherein the parameter includes at least one of a first parameter related to a timing relationship of the second beam and a second parameter related to polarization information of the second beam.

8. The cellular base station of claim 7, wherein the first parameter includes at least one of a K_offset and a common timing offset.

9. The cellular base station of claim 7, wherein the second parameter includes an uplink polarization information and a downlink polarization information.

10. A cellular base station, comprising:
    at least one antenna;
    at least one radio coupled to the at least one antenna; and
    a processor coupled to the at least one radio,
    wherein the cellular base station serves as a non-terrestrial network (NTN) serving base station of a wireless device during a beam switching procedure from a first beam to a second beam in the NTN serving base station, and the processor is configured to:
       configure a parameter associated with the second beam in system information, the parameter being related to NTN mobility,
       wherein the system information is to be acquired by the wireless device during the beam switching procedure,
       wherein a time the system information is to be acquired by is set as 0 in a case where the system information is acquired by the wireless device before the beam switching procedure and is up-to-date to the wireless device, and
       wherein the parameter includes at least one of a first parameter related to a timing relationship of the second beam and a second parameter related to polarization information of the second beam, and wherein the second parameter includes an uplink polarization information and a downlink polarization information.

11. The cellular base station of claim 10, wherein the processor is configured to:
    configure a switching delay caused by the beam switching procedure based on system information acquisition time used by the wireless device to acquire the system information during the beam switching procedure.

12. The cellular base station of claim 10, wherein the first parameter includes at least one of a K_offset and a common timing offset.

* * * * *